United States Patent
Langley

[15] 3,651,433
[45] Mar. 21, 1972

[54] CIRCUIT FOR PROCESSING REFLECTED SIGNALS

[72] Inventor: Lawrence W. Langley, Severna Park, Md.
[73] Assignee: Symbionics, Incorporated, Annapolis, Md.
[22] Filed: Mar. 2, 1970
[21] Appl. No.: 15,583

[52] U.S. Cl. .............................333/70 T, 333/29, 328/28 R, 328/165
[51] Int. Cl. ...................H03h 7/10, H03h 9/00, H03k 5/159
[58] Field of Search ...............333/70 T, 29, 76; 328/14, 26, 328/28, 29, 167, 31, 165

[56] References Cited

UNITED STATES PATENTS

| | | | |
|---|---|---|---|
| 2,922,965 | 1/1960 | Harrison | 333/70 T X |
| 2,987,683 | 6/1961 | Powers | 333/70 T |
| 3,315,171 | 4/1967 | Becker | 333/70 T |
| 3,482,190 | 12/1969 | Brenin | 333/29 |

Primary Examiner—Herman Karl Saalbach
Assistant Examiner—Saxfield Chatmon, Jr.
Attorney—Birch, Swindler, McKie & Beckett

[57] ABSTRACT

A circuit for processing reflected signals is described. The reflected signal is delayed for a period of time which is equal to the period of the first half cycle of the reflected signal. It is also attenuated by an amount equal to the difference in amplitude between the first and second half cycles of the reflected signal. The delayed and attenuated signal is then combined with the reflected signal so that only the first half cycle of the reflected signal and the last half cycle of delayed signal remain.

6 Claims, 8 Drawing Figures

PATENTED MAR 21 1972 3,651,433
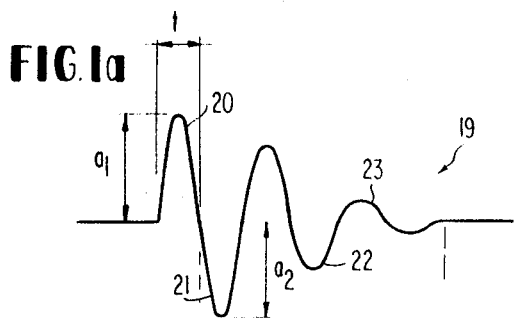
FIG.1a
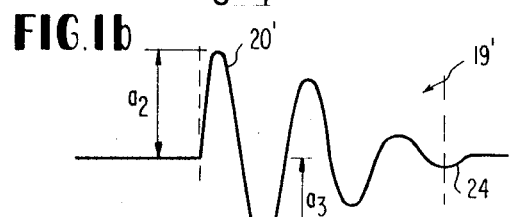
FIG.1b
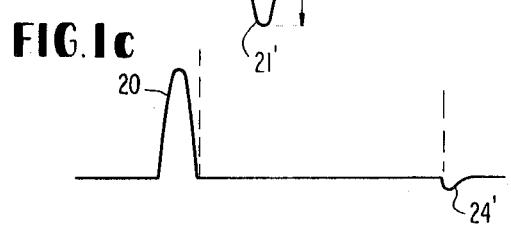
FIG.1c
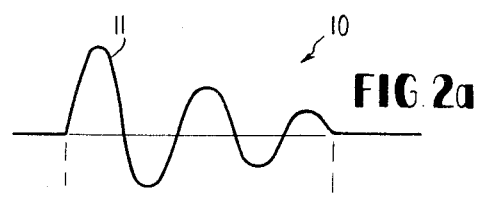
FIG.2a
FIG.2b
FIG.2c
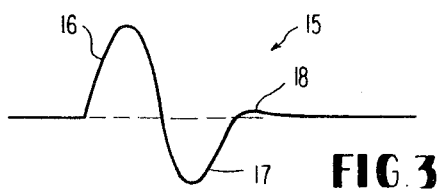
FIG.3
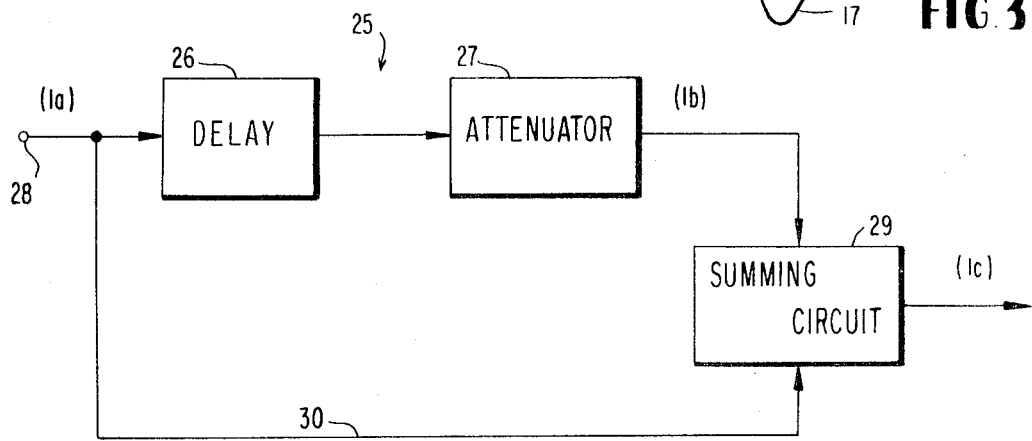
FIG.4
INVENTOR
LAWRENCE W. LANGLEY
BY Berch, Swidler, McKie & Beckett
ATTORNEYS 3,651,433

CIRCUIT FOR PROCESSING REFLECTED SIGNALS

BACKGROUND OF THE INVENTION

The invention is directed to a circuit for processing damped sinusodial signals. Although the manner in which the damped sinusodial signal is generated is immaterial to the invention a more complete appreciation of the invention is obtained by presenting a few methods by which such signals can be generated.

The first method is the actual transmission of a damped sinusodial signal. If a transducer, such as a piezo electric crystal is energized by a short pulse of energy, for example, a high frequency electrical pulse, the output is an exponentially decaying ascoustical signal. Such a signal is illustrated in FIG. 1a.

The damped signal can also be the result of damping caused by the reflecting medium. When an undamped short pulse of sinusodially varying energy is reflected, it is quite possible that the reflecting medium will dampen the transmitted signal and it will then appear as illustrated in FIG. 1a.

It is also possible that the receiving transducer will dampen the signal. This will occur even if the transmitted pulse arrives at the receiver without previous damping or distortion. FIG. 1a again is illustrative of the damped signal.

Irrespective of the manner in which the signal becomes damped the characteristics are much the same. The period remains constant depending upon the characteristics of the damping medium or element. Also, the amplitude decay is exponential, and is determined by the characteristics of the damping element.

In many types of equipment the operation is dependent upon the reproduction of the pulse from the damped reflected signal. Because many of the characteristics of the initial pulse can be reproduced from the first one-half cycle of the damped reflected signal many attempts have been made to reproduce a facisimile of this portion of damped pulse.

Various systems have been devised for reproducing the first one-half cycle of reflected signals and FIG. 2 is useful in illustrating and describing one well known technique. In the method illustrated in FIG. 2 the actual first half cycle is not recovered. Instead an attempt is made to produce as accurate a facsimile as possible of the first one-half cycle.

FIG. 2a represents an exponentially decaying reflected signal. It is noted that each of the successive one-half cycles is smaller in absolute amplitude than the preceding half cycle. In order to reproduce a facsimile of the first one-half cycle 11 the entire reflected signal is integrated. The integration results in a signal which represents the envelope of damped signal as shown in FIG. 2b. The integrated pulse is then differentiated resulting in a pulse 14 as shown in FIG. 2e. The pulse 14 can be argued to be a facsimile of the first half cycle 11 of FIG. 2a because the rise and fall of the pulse 14 are dependent upon the rise and fall of the first half cycle. The time period of the first half cycle 11 and the pulse 14 are therefore substantially equal.

Another well known method of reproducing the first half cycle 11 of a received pulse is illustrated in FIG. 3. This method consists of greatly damping the receiving mechanism so that only a highly attenuated first half cycle and the more highly attenuated second and third half cycles are transmitted through the receiving element. Consequently, the reflected pulse 15 includes the first half cycle 16 of relatively high amplitude but which is lower in amplitude than it would be in the absence of the damping. The next two succeeding half cycles 17 and 18 are more highly damped and for practical purposes the third half cycle 18 is negligible. The decrease in amplitude of the first half cycle is undesirable for usages where the amplitude is an important characteristic of the reflected signal.

SUMMARY OF THE INVENTION

Although the two systems of reproducing a facsimile of the first half cycle of a reflected signal as illustrated by use of FIG. 2 and 3 have some utility they both suffer certain inherent disadvantages.

The two methods produce merely a facsimile of the first half cycle of the reflected signal. For this reason various spikes and other variations of the first half cycle are lost. In this regard, it should be noted that the wave form shown in FIG. 1a is idealized and an actual wave form would have spikes and distortions. The loss of these characteristics in systems which produce merely a facsimile results in the inability to accurately reproduce the sinusodial signal from which the damped signal were generated.

Furthermore, the method utilizing integration and differentiation requires additional operational circuitry and accordingly is expensive and complex.

The invention is accordingly directed to a system for actually recovering the first one half cycle of the reflected signal rather than reproducing a facsimile thereof.

In accordance with the invention, the received reflected signal is delayed by a time period which is equal to the time between the zero crossings of the first one half cycle. The output of the delay circuit is attenuated by an amount which is equal to the difference in the amplitudes of the first and second half cycles of the reflected signal. The output of the attenuator is then algebratically combined with the reflected signal so that the second and all succeeding half cycles of the reflected signal are cancelled while the first half cycle remains substantially unchanged and undistorted.

The proper usage of the system, therefore, requires an accurate knowledge of the time period of the first half cycle. This is easily obtained because the wave form of the reflected signal is highly dependent upon the characteristics of the transducer used to receive the reflected signal. For example, assuming that the receiving transducer is a piezo crystal, it is easy to measure the characteristics of the piezo crystal and the characteristics of the received signal to thereby obtain the time period of the first half cycle and the amplitudes of the succeeding half cycles. For example, for an ultrasonic signal the pulse width of the first half cycle would be approximately 0.2 micro seconds and the difference in amplitude of the first and second half cycles would be one to two db. Equipped with this knowledge, it is an easy matter to build a delay circuit having a 0.2 micro second delay and an attenuator having a 1 to 2 db. attenuation.

BRIEF DESCRIPTION OF THE DRAWINGS

FIG. 1 shows a series of wave forms which is useful in explaining the operation of the invention.

FIGS. 2 and 3 are wave forms useful in explaining the operation of prior art systems.

FIG. 4 is a block diagram of a preferred embodiment of the invention.

DETAILED DESCRIPTION OF THE INVENTION

Referring to FIG. 1a the reflected pulse is indicated generally by reference numeral 19. The first one half cycle 20 has a period indicated by $t$. That is $t$ represents the time required for the pulse to rise from zero through its peak value and return to zero. The amplitude of the first half cycle 20 is indicated by $a1$ while the amplitude of the second half cycle 21 is indicated by $a2$. As used herein the amplitudes $a1$ and $a2$ are absolute values without regard to their positive or negative polarities. The succeeding half cycles 22, 23, etc., are seen to decay exponentially from the absolute values of the first and second half cycles 20 and 21 respectively.

The primary purpose of the inventive circuit is the elimination of the half cycles 21, 22, 23, etc., while maintaining the first half cycle 20 substantially undistorted, unattenuated and otherwise unchanged from its received characteristics.

The first step in this is accomplished by delaying the entire reflected signal 19 by time period $t$ as illustrated in FIG. 1b. By simultaneously viewing FIGS. 1a and 1b it is noted that the first half cycle 20' of FIG. 1b is now coincident in time with the second half cycle 21 of FIG. 1a. However, because their polarities are opposite the algebraic addition of these two pulses will result in a small pulse equal to the difference between the two initial pulses. That is, a pulse of amplitude equal to $a1-a2$ and having a positive polarity. The polarity obviously would depend upon the actual reflected wave. However, it is positive for the wave 19 shown in the drawings. This difference is easily eliminated by attenuating the reflected signal by an amount equal to the difference between the two initial amplitudes. When the reflected signal 19 is subjected to the attenuation the first half cycle 20' of FIG. 1b is now equal in absolute value or amplitude to the second half cycle 21 of FIG. 1a. Consequently, the algebraic addition of the unprocessed reflected wave 19 and the attenuated and delayed reflected wave 19' will result in the wave form shown in FIG. 1c. In this figure the first half cycle 20 of the reflected wave 19 of FIG. 1a remains substantially undistorted and unchanged. The last half cycle 24 of the delayed and attenuated signal 19' will appear as a small negative pulse 24' in the wave form of FIG. 1c. However, this signal is insignificant as compared to the amplitude of the first half cycle 20. Furthermore, if necessary it can be removed by an inexpensive diode. This is especially convenient because its polarity is different from that of the first half cycle.

A few other negative and positive spikes will also appear across the wave form of FIG. 1c. These will result from the linear attenuation of the reflected wave in the attenuating circuit. The entire reflected signal 19 is attenuated by an equal amount. However, the amplitude decay of the reflected signal is exponential. Consequentially, a slight inaccuracy will occur in the third and succeeding half cycles. However, the small pulses resulting from this inaccuracy will be of insignificant magnitude and will have no affect on the control circuit. Furthermore, even if they are slightly higher than what is ordinarily considered to be acceptable, an inexpensive filtering circuit can be used to remove them completely.

A few other spikes may also be present because the spikes and variations of the first half cycle will differ from those of the second half cycle. There can also be filtered off by the same inexpensive filter used to remove the previously mentioned spikes.

FIG. 4 illustrates a preferred embodiment of the inventive circuit in which the processing circuitry is represented generally by reference numeral 25. The processing circuit includes a delay circuit 26 which is used to delay the reflected signal by the amount equal to the time $t$ of FIG. 1a. The output of delay circuit 26 is injected into an attenuator 27 which attenuates the reflected signal an amount equal to the difference between the amplitudes $a1$ and $a2$ of FIG. 1a.

The input signal to the control circuit 25 which appears on the input terminal 28 will be the damped signal 19 illustrated in FIG. 1a. The output of the attenuator will appear as wave 19' shown in FIG. 1b. The wave form 19' of FIG. 1b is injected into the summing circuit 29, as is the initial damped signal 19 by way of line 30. The output of summing circuit 29 is, therefore, the wave form shown in FIG. 1c. The output of the processing circuit 25 is composed almost solely of the initial one-half cycle 20 of the reflected signal. Although there are not illustrated any spikes or variations present on the first half cycle when it is first injected into the processing circuit such, will also be present on the output pulse because the first half cycle has not been operated upon or changed in any way. A very accurate reproduction of the signal from which the damped signal was derived is therefore possible.

I claim:

1. A circuit for processing a signal to produce an output which is a substantially unchanged portion of said signal comprising:
    an input terminal for receiving said signal;
    delay means for delaying said received signal by a time period which is less than the total time period of said signal;
    attenuation means for attenuating said delayed signal by a predetermined amount;
    summation means for algebraically summing said received signal and the output of said attenuation means so that the output of said processing circuit presents a pulse which is substantially identical to a first portion of said received signal.

2. The circuit of claim 1 wherein said first portion is the first one-half cycle of said received signal.

3. The circuit of claim 1 wherein said predetermined amount is equal to the difference in amplitude of the first one-half cycle and the second one-half cycle of said received signal.

4. The circuit of claim 1 wherein said delay period is the time period of the first one-half cycle of said received signal.

5. The circuit of claim 2 wherein said predetermined amount of attenuation is equal to the increment of amplitude decay naturally suffered by said received signal between its first and second one-half cycles;
    and wherein said delay period is equal to the time period of said first one-half cycle of said received signal.

6. The circuit of claim 1 wherein the first and second one-half cycles of said received signal are of opposite polarity;
    said delay means delays said received signal by a time equal to the time period of said first one-half cycle;
    said attenuation means attenuates said first one-half cycle by an amount required to make its amplitude equal to the amplitude of said second one-half cycle;
    said summation means algebraically adds said received signal and output of said attenuation means so that the preceding one-half cycle of the delayed and attenuated signal cancels the succeeding one-half cycle of the received signal.

* * * * *